United States Patent Office 2,764,578
Patented Sept. 25, 1956

2,764,578

VINYLOXYALKYL QUATERNARY AMMONIUM COPOLYMERS

Arthur L. Barney, Wilmington, Del., assignor to E. I. du Pont de Nemours and Company, Wilmington, Del., a corporation of Delaware No Drawing. Application April 18, 1952,
Serial No. 283,140

7 Claims. (Cl. 260—85.5)

This invention relates to polymers and more particularly to polymers of monoethylenically unsaturated quaternary ammonium compounds.

This application is a continuation-in-part of my copending applications Serial Numbers 216,838 and 216,839, now U. S. Patent No. 2,677,679, filed March 21, 1951.

Polymeric materials which may be employed in solution to give films and fibers of high strength have achieved considerable importance in recent years. For example, acrylonitrile polymers acquired importance for such uses when a suitable solvent was found. Polyacrylonitrile is a relatively high softening polymer which is generally inert to water and common organic solvents such as those used in the dry-cleaning industry. This general inertness is of course a great advantage in many ways but the inertness is a disadvantage when dyed products are desired. It would be highly desirable to obtain an acrylonitrile polymer which retains its general inertness and strength but which is susceptible to dyeing by conventional dyeing techniques. One method of attaining this result has been evolved—that of U. S. 2,491,471, whereby a dyeable but otherwise highly inert copolymer of acrylonitrile is obtained by polymerizing acrylonitrile with a small percentage of vinylpyridine. The supply of vinylpyridine is however limited and commercial costs thereof are rather high. An alternative route to a dyeable, inert acrylonitrile polymer is therefore of very great interest, particularly in view of the increasing importance of acrylonitrile fibers. The preparation of polymers which have good solubility as well as functional groups that contribute to receptivity toward dyestuffs or can be further modified would be of considerable utility. Polymeric quaternary ammonium compositions also have utility in the preparation of ion exchange products which are of use for the purification of water, separation of ionic materials, and in the construction of film where layers of selected pH sensitivity are required.

This invention has as an object the preparation of polymers and copolymers. Another object is a process for the preparation of polymers having quaternary ammonium groups. A further object is the preparation of acrylonitrile polymers of improved dye receptivity but with the inertness of acrylonitrile homopolymers but slightly, if at all, impaired. A further object is a process for obtaining this result. Other objects will appear hereinafter.

These objects are accomplished by the invention of polymers, particularly copolymers, preferably with acrylonitrile, of tetraalkylammonium salt monomers having on one, and only one, alkyl group a further substituent and that a vinyloxy radical. These polymers are obtained by polymerizing the monomer or monomer composition at a temperature within the range 20–100° C. with the aid of, as an initiator, a free radical generating polymerization catalyst, preferably in an aqueous solution.

The following examples in which parts are by weight are illustrative of the invention.

EXAMPLE I

A. *Preparation of β-vinyloxyethyltrimethylammonium chloride*

A solution of 60 parts of β-vinyloxyethyldimethylamine in 80 parts of benzene was introduced into a Monel metal pressure vessel capable of holding 1000 parts of water. The bomb was cooled, flushed with nitrogen and connected to a cylinder of methyl chloride. Methyl chloride vapor (a total of 30 parts) was admitted to the bomb to a total pressure of 50 lbs./sq. in. at 25–30° C. During two hours the pressure in the bomb dropped to 20 lbs./sq. in. while the temperature remained at 25–30° C. The bomb was repressured with methyl chloride to 50 lbs./sq. in. but no further pressure drop was noted in one hour. At this time unreacted methyl chloride was vented from the bomb and the bomb was opened. A suspension of a white crystalline solid in benzene was found. The benzene and suspended solid were removed from the bomb and the white crystalline product isolated by evaporation of the liquid under reduced pressure. The white crystalline β-vinyloxyethyltrimethylammonium chloride obtained on evaporation of the benzene solution was washed with ether and used for the polymerization experiments in B. The corresponding methiodide, prepared in acetone solution from equivalent amounts of the above tertiary amine and methyl iodide was a relatively non-hygroscopic solid, M. P. 182° C. Analysis for ionic iodine showed 49.3%. The theory for the expected methiodide is 49.4%.

B. *Preparation of a copolymer of acrylonitrile with β-vinyloxyethyltrimethylammonium chloride*

A mixture of 18 parts of redistilled acrylonitrile, 2 parts of the β-vinyloxyethyltrimethylammonium chloride of A, 80 parts of distilled water, 0.3 part of thiourea and 5 parts of 3% hydrogen peroxide solution was agitated at room temperature under nitrogen. Polymer formation was immediately evidenced by the separation of a white powder and a temperature rise to 45° C. External cooling caused the temperature to fall again to 25–30° C. at which level it was maintained for 1.5 hours. At the end of this period the precipitated, powdery polymer was collected on a filter, washed with water and methanol and dried. Ten parts of polymer was obtained.

The product was insoluble in a number of organic solvents such as benzene, acetone, chloroform, ether and alcohols, but dissolved readily in dimethylformamide to form a viscous solution. A film cast on glass at 70–80° C. from a 10% solution of the polymer in dimethylformamide was clear, water-white and strong. Strips of the cast film were readily oriented by drawing at 60° C.

Strips of the unoriented polymer film were used to determine receptivity toward typical acid dyes in comparison with polymers of acrylonitrile alone, or acrylonitrile with 5% 2-vinylpyridine. The results are tabulated below.

| Polymer from— | Receptivity toward acid dyes at pH | | |
|---|---|---|---|
| | 2 | 4 | 6 |
| Acrylonitrile | none | none | none. |
| 90 acrylonitrile/10 β-vinyl-oxyethyltrimethylammonium chloride. | excellent | excellent | excellent. |
| 95 acrylonitrile/5 2-vinyl-pyridine. | do | fair | poor. |

Samples of films of the copolymers of acrylonitrile with 10% β-vinyloxyethyltrimethylammonium chloride and 5% 2-vinylpyridine respectively were heated in an oven in air at 135°. The two polymers gradually darkened and embrittled during 36 hours heating: there was no marked difference in degradation rate although the polymer containing the quaternary salt structure appeared more stable.

EXAMPLE II

Monomer mixtures having acrylonitrile/β-vinyloxy-ethyltrimethylammonium chloride ratios of 95:5, 97.5:2.5 and 99:1 were polymerized in essentially the same manner as described in Example I. The resulting polymers, obtained in conversions of 65, 90 and 85%, respectively, were isolated in the same way. The polymers formed viscous solutions in dimethylformamide and films cast from these solutions showed good receptivity to acid dyes at pHs as high as 6. Dark color indicative of the absorption of relatively large amounts of the dye were obtained with the polymers from the 95:5 and 97.5:2.5 compositions while a paler shade was obtained from the 99:1 composition. The latter was greatly improved in dye receptivity in comparison with an acrylonitrile homopolymer.

EXAMPLE III

A mixture of 19 parts of acrylonitrile, 1 part of β-vinyloxyethyltrimethylammonium chloride, 80 parts of distilled water, 0.3 part of ammonium persulfate, 0.2 part of sodium bisulfite and 0.5 part of sodium dihydrogen phosphate was agitated for four hours at 40° C. under nitrogen. Nineteen parts of polymer was isolated in the manner described in the previous examples. Films of the polymer cast from dimethylformamide solution were readily orientable at 60-70° C. and showed excellent receptivity to acid dyes at pH of 6. The polymer had an inherent viscosity (0.2% in dimethylformamide at 25° C.) of 1.72.

When the above procedure was repeated using one part of allyltrimethylammonium chloride in place of the β-vinyloxyethyltrimethylammonium chloride, a 90% conversion to polymer was obtained but the product in film form showed very poor receptivity to acid dyes.

The present invention is generic to polymers from vinyloxyalkyltrialkylammonium salts including copolymers with other addition polymerizable monoethylenically unsaturated monomers. Particularly useful as polymerizable monomers are the β-vinyloxyethyltrialkylammonium salts.

The polymers of this invention are obtained by the polymerization, including copolymerization, of monomers of the formula

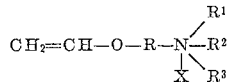

wherein X is a monovalent salt forming anion, that of an acid, HX, of molecular weight of not greater than 250, R is a divalent saturated aliphatic hydrocarbon radical having its free valences stemming from different carbons, and R¹, R², and R³ are alkyl radicals preferably of up to four carbons, i. e., each not more than four carbons, generally having a total of 3 to 12 carbons and preferably of 3 to 9 carbons. The monovalent anion X is salt-forming and is generally halide, e. g., chloride, sulfate, e. g., methyl sulfate anion, and sulfonate, e. g., paratoluene or cyclohexyl sulfonate anion.

The quaternary ammonium compounds are obtained by reaction of a vinyloxyalkyldialkylamine with an alkyl ester of an inorganic acid, e. g., an alkyl halide or sulfate. The alkyl in the quaternizing agent is preferably lower alkyl, i. e., an alkyl of one to four carbons. Examples of such esters are alkyl halides, e. g., methyl iodide, butyl bromide, ethyl chloride; alkyl sulfates, e. g., methyl sulfate; alkyl sulfonates, e. g., ethyl p-toluene sulfonate; alkyl phosphates, e. g., triethyl phosphate; alkyl phosphites, e. g., triethyl phosphite; etc.

The polymerization and copolymerizations of this invention are preferably conducted in a hydroxylated solvent in which the monomeric material, catalyst and diluent are uniformly dispersed. Although water is generally satisfactory, other hydroxyl containing solvents that are useful are monohydric alcohols, particularly those of one to four carbons, e. g., tertiary-butanol.

The time and temperature required for substantial amount of polymerization to take place are dependent upon the monomers and catalyst employed. Suitable temperatures are of the order of 20–100° C. Times from one to twenty-four hours are customarily employed.

The polymerization catalyst employed is a free-radical type catalyst. Suitable catalysts are the peroxygen compounds such as potassium persulfate or benzoyl peroxide, azo compounds having the azo, —N=N—, group acyclic joined to discrete non-aromatic carbons at least one of which is a tertiary carbon in turn joined to carbon whose remaining valences are satisfied by oxygen and/or nitrogen (as in U. S. 2,471,959) such as azodiisobutyronitrile, combinations of thiourea with hydrogen peroxide, a bromate with a bisulfite, hydrogen peroxide with a titanous salt, etc. Various of the latter type catalyst systems are effective in aqueous media at relatively low temperatures, e. g., 0–40° C. The amount of catalyst employed is generally small, e. g., 0.01-5% by weight of the polymerizable monomers.

Although homopolymers of the vinyloxyalkyltrialkylammonium salts can be prepared by the use of ionic catalysts in an inert medium, these homopolymers are not of sufficiently high molecular weight to be satisfactory for most plastic applications and particularly films and fibers where a molecular weight of at least 5000 and preferably 10,000 to 100,000 is desired. Copolymers preferably with at least an equimolar proportion of another polymerizable vinylidene compound preferably catalyzed by free-radical initiators possess greater utility in view of the combination of physical properties along with the properties imparted by the quaternary compound. Such copolymers have a molecular weight generally of at least 10,000 and are suitable for plastic applications, including films and fibers.

The process of this invention is of advantage in that the reaction is clean and readily carried out under normal conditions of heat and pressure whereas the afterquaternization of a tertiary amino polymer does not result in complete quaternization.

The vinyloxyalkyltrialkylammonium monomers can be polymerized in admixture with one or more other such monomers or with one or more other polymerizable vinylidene compounds, i. e., those having a terminal methylene including olefins, e. g., ethylene; acrylyl and methacrylyl compounds, e. g., acrylonitrile, methyl acrylate, methacrylic esters and methacrylamide; vinyl and vinylidene halides, e. g., vinyl and vinylidene chloride; vinyl carboxylates, e. g., vinyl acetate; other vinyl derivatives such as styrene and methyl vinyl ketone; and dienes such as chlorobutadiene and butadiene.

Usually the amount of the quaternary vinyloxyalkyltrialkyl ammonium compound present in the polymer is proportional to the amount employed in the polymerization. The amount of quaternary employed is at least 1% and the amount present in the polymer including copolymer is at least 1% and generally at least 2%.

Particularly important are the copolymers with acrylonitrile, the acrylonitrile being present in major amount, i. e., to the extent of at least 85%, on a weight basis. In general the most suitable combination of dyeing properties and physical properties of the oriented product is achieved when 1% to 15% of the vinyloxyalkyltrialkylammonium comonomer unit is present in the polymer. Preferably the amount of quaternary monomer is 2% to 10%.

Although the acrylonitrile is the major constituent in the acrylonitrile copolymer, minor amounts of other monoethylenically unsaturated polymerizable monomer units, e. g., from methacrylonitrile, vinyl acetate, etc., which together with the vinyloxyalkyltrialkylammonium monomer units comprise up to about 15%, based on the total weight of the copolymer, may also be present.

The recurring quaternary ammonium compound unit present in the copolymer corresponds to a vinyloxyalkyltrialkylammonium salt monomer, i. e., one which in the polymer furnishes two chain carbons, one of which is a $CH_2$ carbon, the other being directly attached to an oxyalkyltrialkylammonium salt group. Ordinarily only one vinyloxyalkyltrialkylammonium monomer is employed but two or more may be used providing the total in the copolymer does not exceed 15%. The preferred acrylonitrile copolymers of this invention are macromolecular and composed of recurring structural units at least 85% of which are acrylonitrile units and at least 1% of which are vinyloxyalkyltrialkylammonium monomer units, any remainder being units of a monoethylenically unsaturated polymerizable monomer, i. e., a polymerizable monomer having one double bond as its only ethylenic carbon-carbon unsaturation, i. e., the copolymer consists of monoethylenically unsaturated monomer units at least 85% of which are acrylonitrile and at least 1% of which are vinyloxyalkyltrialkylammonium monomer units as above defined.

The acrylonitrile copolymers of this invention are particularly useful in the preparation of oriented objects such as fibers which have excellent strength and water resistance with improved dye absorption properties particularly with acid dyes. Furthermore, the products of this invention have good stability under hydrolytic conditions and conditions of high temperature. They are superior in such properties to the corresponding amine acid salts. Furthermore, the acrylonitrile copolymers dye more deeply than do copolymers having similar structure but with the ether linkage displaced by the ester linkage, such as in carbovinyloxymethyltrimethylammonium sulfate.

The foregoing detailed description has been given for clearness of understanding only and no unnecessary limitations are to be understood therefrom. The invention is not limited to the exact details shown and described for obvious modifications will occur to those skilled in the art.

What is claimed is:

1. A process for the preparation of polymers wherein a monomer composition consisting of monomers having a non-aromatic carbon-carbon unsaturation and that ethylenic, at least 1% of which is a vinyloxyalkyltrialkylammonium salt wherein each alkyl group is of up to four carbons, is brought into contact with a free-radical type polymerization catalyst in uniform dispersion in a hydroxylated solvent for the vinyloxyalkyltrialkylammonium monomer.

2. A process for the preparation of polymers wherein a monomer composition consisting of monomers having a non-aromatic carbon-carbon unsaturation and that ethylenic, at least 1% of which is a vinyloxyalkyltrialkylammonium salt wherein each alkyl group is of up to four carbons, is brought into contact with a free-radical type polymerization catalyst.

3. Process of claim 2 wherein the polymerization is conducted in aqueous dispersion.

4. Process of claim 3 wherein the monomer composition contains at least 85% acrylonitrile and 1–15% of the vinyloxyalkyltrialkylammonium monomer.

5. A polymer of beta-vinyloxyethyltrimethylammonium sulfate.

6. A polymer of a vinyloxyalkyltrialkylammonium salt wherein the three unsubstituted alkyl groups have a total of 3 to 12 carbons.

7. A copolymer composed essentially of units of polymerizable monoethylenically unsaturated monomers of which at least 85% by weight are acrylonitrile units and from 1% to 15%, by weight, are units of a vinyloxyalkyltrialkylammonium salt wherein each alkyl group is of up to four carbons.

References Cited in the file of this patent

UNITED STATES PATENTS

| | | |
|---|---|---|
| 2,601,251 | Bruson | June 24, 1952 |
| 2,617,781 | Lytton | Nov. 11, 1952 |
| 2,631,995 | Bruson | Mar. 17, 1953 |

OTHER REFERENCES

Butler and Goette: J. Am. Chem. Soc., 74, pages 1939 et seq., April 20, 1952 (abstract of the University of Florida M. S. thesis of Goette; thesis date December 8, 1950).